(12) United States Patent
Pica

(10) Patent No.: US 7,881,154 B2
(45) Date of Patent: Feb. 1, 2011

(54) SEISMIC PROCESSING FOR THE ELIMINATION OF MULTIPLE REFLECTIONS

(75) Inventor: Antonio Pica, Vanves (FR)

(73) Assignee: Cggveritas Services SA, Massy (FR)

( * ) Notice: Subject to any disclaimer, the term of this patent is extended or adjusted under 35 U.S.C. 154(b) by 69 days.

(21) Appl. No.: 11/578,175

(22) PCT Filed: Oct. 10, 2005

(86) PCT No.: PCT/EP2005/055129

§ 371 (c)(1),
(2), (4) Date: Oct. 11, 2006

(87) PCT Pub. No.: WO2006/037815

PCT Pub. Date: Apr. 13, 2006

(65) Prior Publication Data

US 2007/0214663 A1      Sep. 20, 2007

(30) Foreign Application Priority Data

Oct. 8, 2004    (FR) .................................. 04 10672

(51) Int. Cl.
*G01V 1/38* (2006.01)

(52) U.S. Cl. .............................. 367/21; 367/24; 702/17

(58) Field of Classification Search .................. 367/21, 367/24; 702/17
See application file for complete search history.

(56) References Cited

U.S. PATENT DOCUMENTS

| | | | | |
|---|---|---|---|---|
| 5,349,527 A * | 9/1994 | Pieprzak et al. | ................ | 702/17 |
| 5,894,417 A * | 4/1999 | Dorn | ........................... | 702/14 |
| 6,058,074 A * | 5/2000 | Swan et al. | .................... | 367/38 |
| 6,101,448 A * | 8/2000 | Ikelle et al. | .................... | 702/17 |
| 6,317,695 B1 * | 11/2001 | Zhou et al. | ..................... | 702/17 |
| 6,418,380 B1 * | 7/2002 | Pica | ........................... | 702/18 |
| 6,507,787 B1 * | 1/2003 | Da Silva et al. | ................ | 702/1 |
| 6,735,527 B1 * | 5/2004 | Levin | .......................... | 702/14 |
| 7,149,630 B2 * | 12/2006 | Abma | ......................... | 702/17 |
| 2002/0049540 A1 * | 4/2002 | Bevc et al. | ..................... | 702/2 |
| 2002/0116160 A1 * | 8/2002 | Lailly et al. | .................... | 703/5 |

FOREIGN PATENT DOCUMENTS

| | | |
|---|---|---|
| EP | 1 094 339 | 4/2001 |
| WO | WO 9919750 A1 * | 4/1999 |

* cited by examiner

*Primary Examiner*—Mark Hellner
(74) *Attorney, Agent, or Firm*—Fulbright & Jaworki, L.L.P.

(57) ABSTRACT

Seismic processing method, in which, in order to eliminate multiple reflections on seismic data, seismic data are migrated in time or in depth (110) arid the data thus migrated are processed to determine an approximation of multiple reflections to be subtracted from, seismic data (120 to 160).

8 Claims, 7 Drawing Sheets

SEISMIC PROCESSING FOR THE ELIMINATION OF MULTIPLE REFLECTIONS

CROSS-REFERENCE TO RELATED APPLICATION

Figure 1:
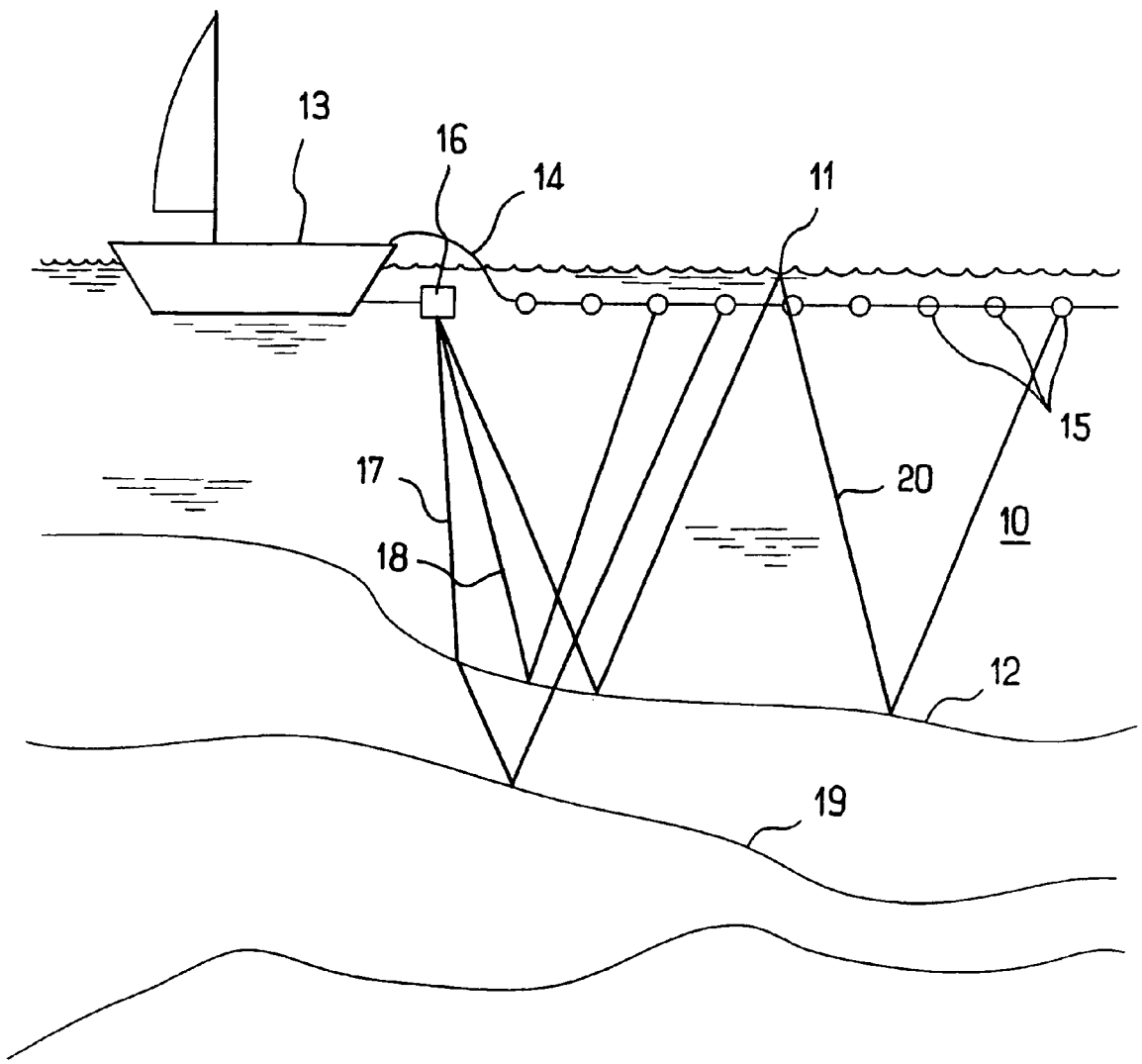

This national phase application is based on PCT/EP2005/055129 filed on Oct. 10, 2005 which claims priority to French Application No. 0410672 filed Oct. 8, 2004 entitled "Improvement to Seismic Processing for the Elimination of Multiple Reflections".

This invention relates to seismic processing methods.

More particularly, it relates to methods of eliminating multiple reflections.

GENERAL TECHNICAL DOMAIN

It is known that one widely used technique for searching for oil or gas consists of seismic prospecting of subsurface formations. The geophysicist uses "seismic reflection" techniques to produce an image of subsurface formations.

These techniques consist of emitting acoustic signals from the ground surface and recording them after successive reflections on interfaces between geological formations.

In land seismic exploration, seismic vibrations (compression and shear waves) are emitted from several points on the ground surface called shot points, and acoustic waves reflected by interfaces between geological formations called reflectors, are collected at different points on the surface using seismic receivers (geophones).

Seismic receivers convert the reflected waves into electrical signals. There is a sufficient number of these receivers and they are laid out in such a manner that the recorded signals called traces form seismic data and can be used to image the structure of the geological layers.

In practice, the signal recorded by a seismic receiver has an amplitude that varies continuously as a function of time and the recorded peaks normally correspond to reflectors between layers.

In reality, the interpretation of the data of a shot is much more complex. Firstly, waves can propagate through a first interface between layers and reflect on the next interface, and then on the first interface and so on before reaching the geophone. Secondly the amplitude of records reduces very quickly as a function of time. Therefore, records include peaks corresponding to multiple reflections or spurious reflections that should be eliminated before the structure of the subsurface can be correctly imaged.

A similar technique is used for seismic prospecting at sea, shots being carried out a few meters under the surface of the water and the seismic receivers or hydrophones themselves being located at the same depth.

In this seismic prospecting method, the disadvantages mentioned above are amplified because the sea floor is highly reflecting, as well as air/water interfaces.

Therefore one general purpose of this invention is to provide a method of seismic processing for at least partially eliminating undesirable signals corresponding to multiple reflections in records produced by seismic receivers as a result of a seismic shot.

STATE OF THE ART

A number of seismic processing methods have been proposed in the past to attenuate multiple reflections in seismic records. These methods are based mainly on two techniques:

the first consists of using data to image the subsurface, the second consists of modelling multiple reflections in order to subtract them from seismic data and thus to keep only useful seismic data, namely primary reflections, in order to image the subsurface.

Verschuur et Al., 1992, [1], have presented a method in which seismic data are used to model multiple reflections in the two-dimensional domain.

Van, Dedem and Verschuur, 1998, [2], also presented a generalisation of the method to the three dimensional domain. In both cases, the method of modelling multiple reflections based on seismic data requires convolutions between acquired data traces and shot point traces located at receiver positions.

However, this method is disadvantageous in that there is no acquired shot point for each receiver location.

Wiggins, 1988, [3] proposed another method using wave extrapolation techniques. In this method, Wiggins proposes to propagate data acquired on the surface through the water layer until the sea floor such that the former primary waves (incident waves) coincide in space with backward propagated multiple reflections (reflected multiple reflections). Adaptive subtraction operators between these two wavefields thus represent the reflectivity of the sea floor.

However, this method has the disadvantage that it requires knowledge of the sea floor topography for adapting two propagated wave fields at the right position. Furthermore, the method was only presented in the two-dimensional domain.

In older work, Berryhill and Kim, 1986 [4] also proposed to use wave equation extrapolation for modelling peg-legs. Their method consists of making an wave equation extrapolation (redatuming) in the two-dimensional domain, in fact by using a Kirchhoff integral, of the recorded seismic data up to the selected sea floor, and then up to the surface. Once again, it suffices to know the wave propagation velocity in the water layer and the sea floor, in addition to the input shot points.

Very recently, like Berryhill and Kim (1986), Lokshtanov, 2000, [5], showed an implementation for actual wave equation prediction, this time in the π-p domain. With this process, peg-legs in the water layer are subtracted using the sea floor layout. Reflection coefficients along the sea floor are supposed to be equal to 1 regardless of the propagation angle.

However, one disadvantage of the two methods mentioned above is the need for knowledge of the sea floor topography.

In some cases (marine seismic exploration for very deep sea floor), this topography is unknown to geologists and it cannot be determined precisely enough to obtain usable results.

One purpose of this invention is to provide a method for overcoming at least one of the above-mentioned disadvantages.

PRESENTATION OF THE INVENTION

According to the invention, there is provided a seismic processing method in which, in order to eliminate multiple reflections in seismic data, seismic data are migrated in time or in depth, the data thus migrated are processed to determine an approximation of multiple reflections, and said approximation of multiple reflections is subtracted from seismic data.

It should be noted that unlike prior art modelling techniques based on seismic data, the modelling of surface multiple reflections from the migration of seismic data may be used without the need for dense acquisition geometries.

Moreover, the method presented above may be applied to acquisition using Ocean Bottom Cables (OBC).

Furthermore, there is no need to select the depth(s) of the sea floor, since the waveforms of migrated events are used as reflectors at their own locations.

Furthermore, not only the sea floor, but also any reflector located under the sea floor is involved in the multiple reflections generation, as long as its depth allows a good knowledge of the propagation velocity field.

Finally, the method of modelling multiple reflections does not require any manipulation of seismic data. The method only requires the coordinates of traces and the migrated section. The contribution of seismic data only occurs at the conventional migration step.

PRESENTATION OF THE FIGURES

Figure 2:
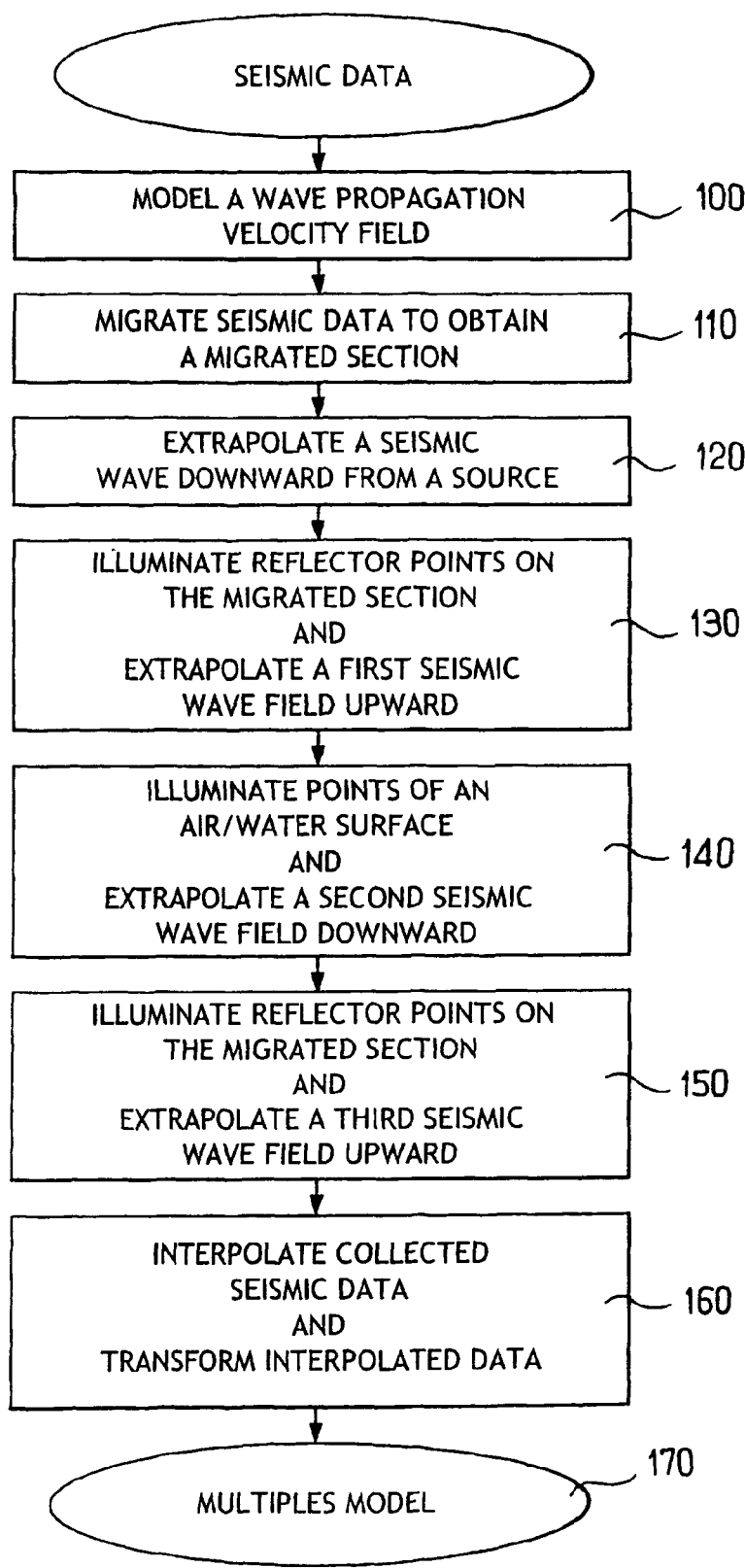
Figure 3:
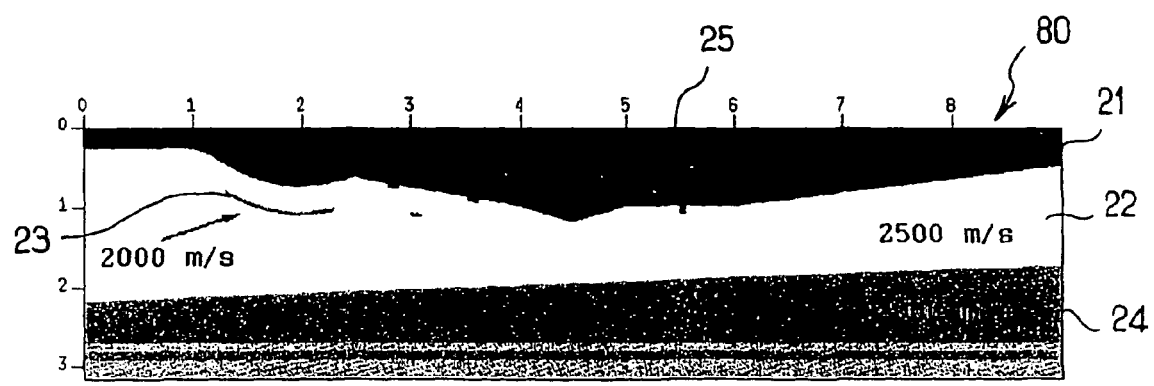
Figure 7:
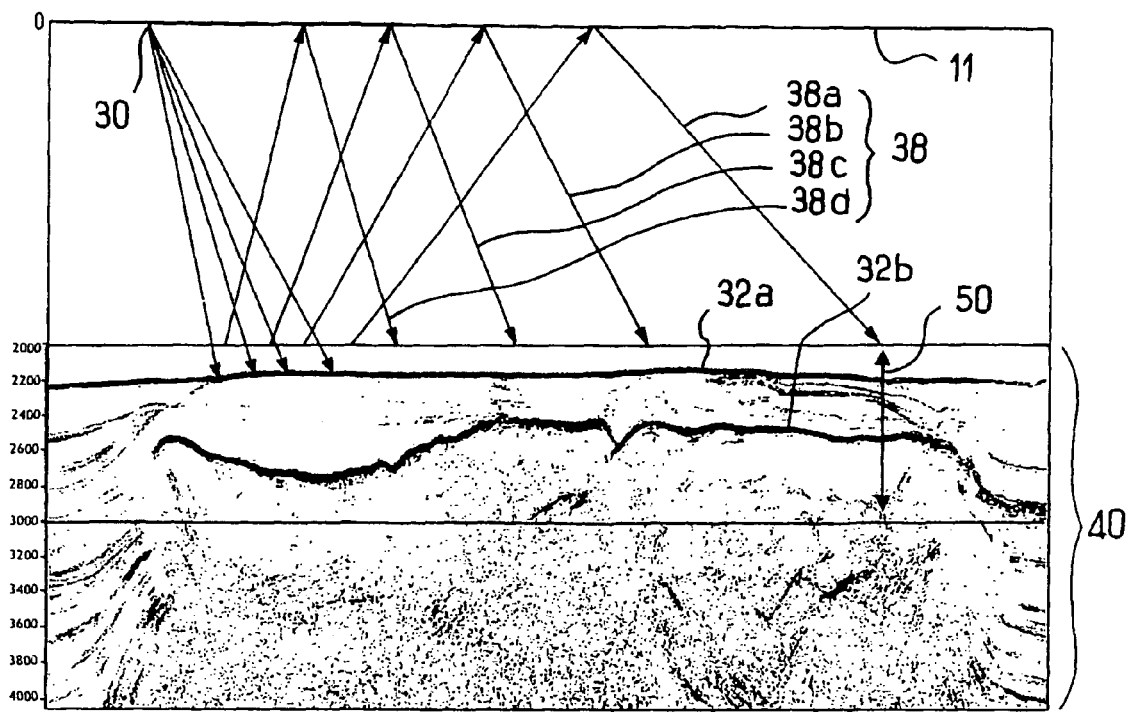
Figure 8:
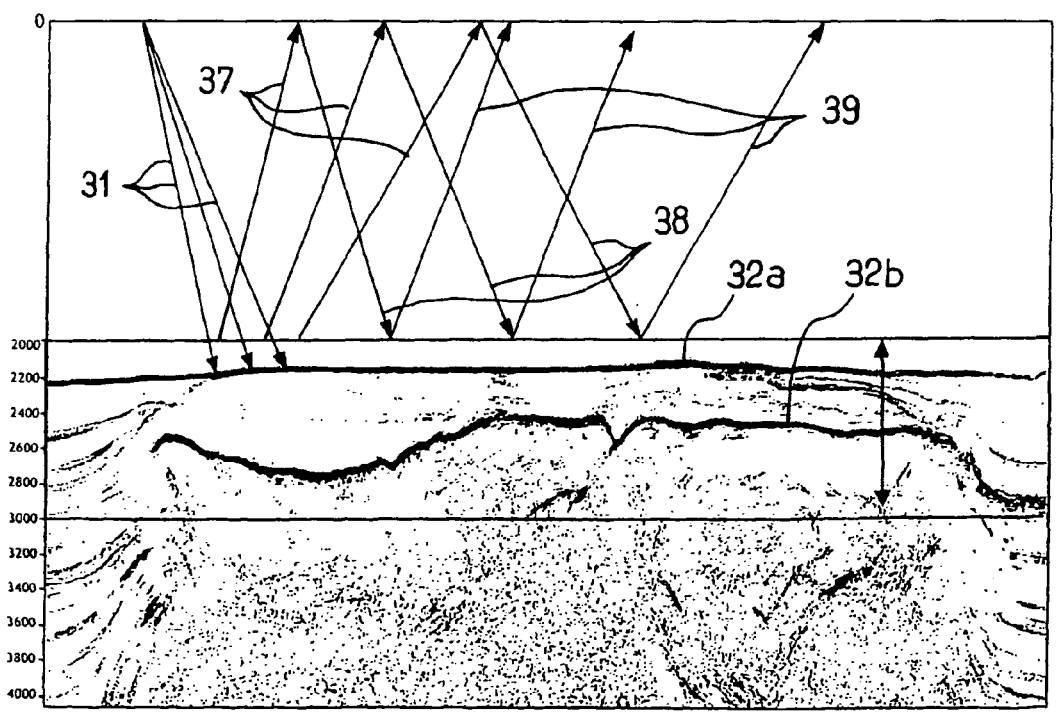
Figure 9:
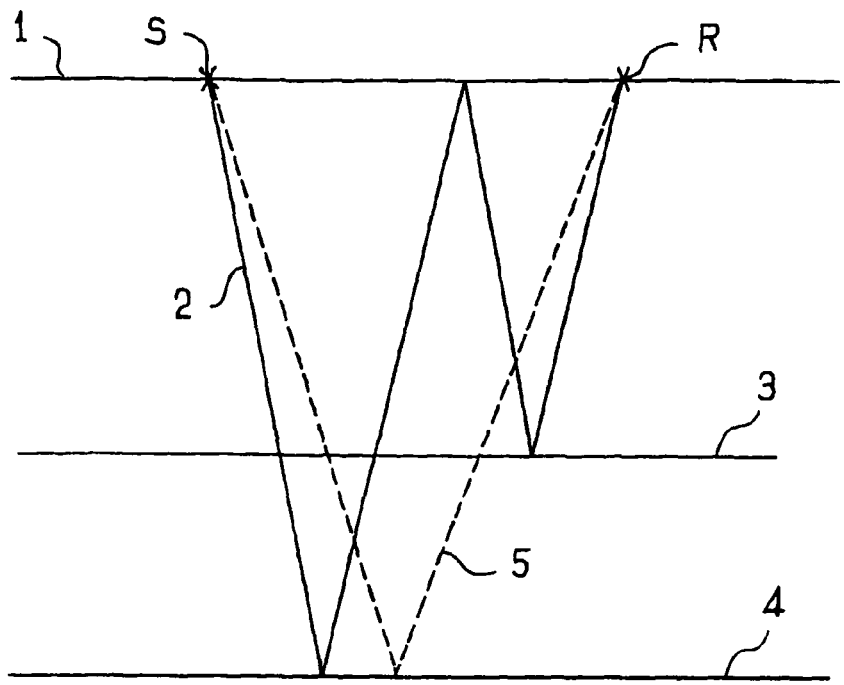
Figure 10:
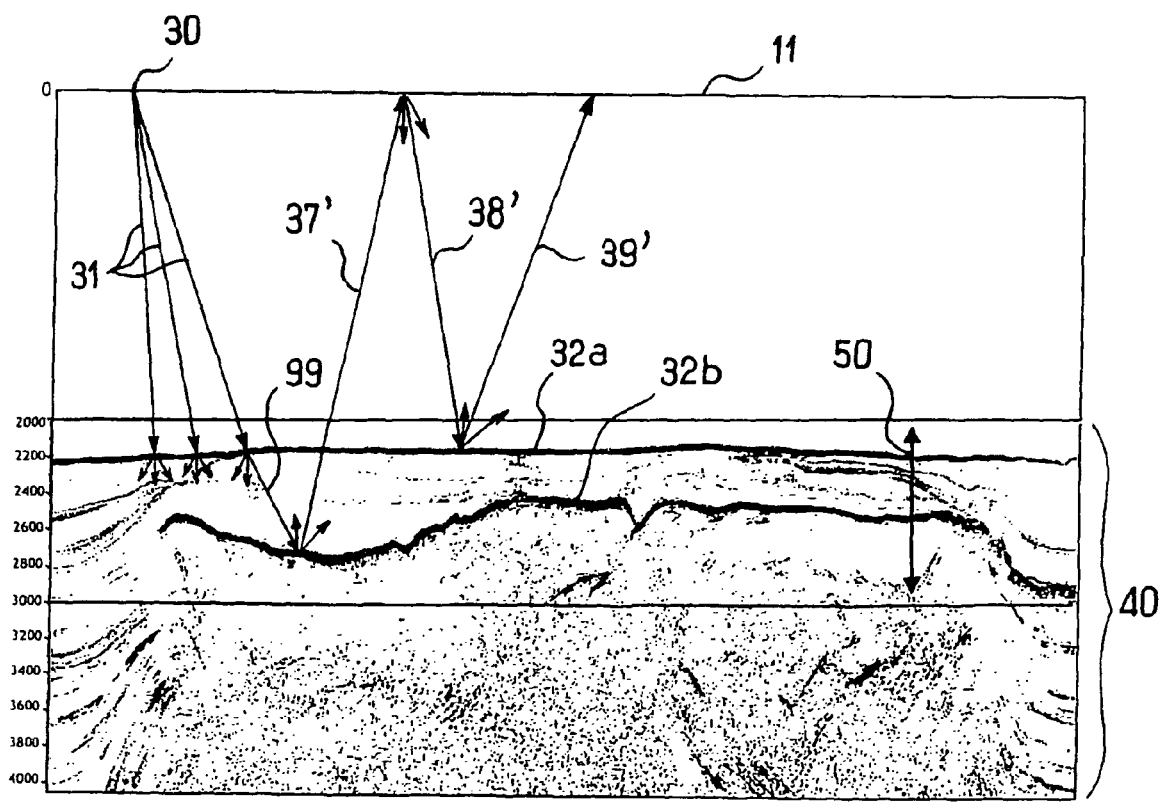
Figure 11:
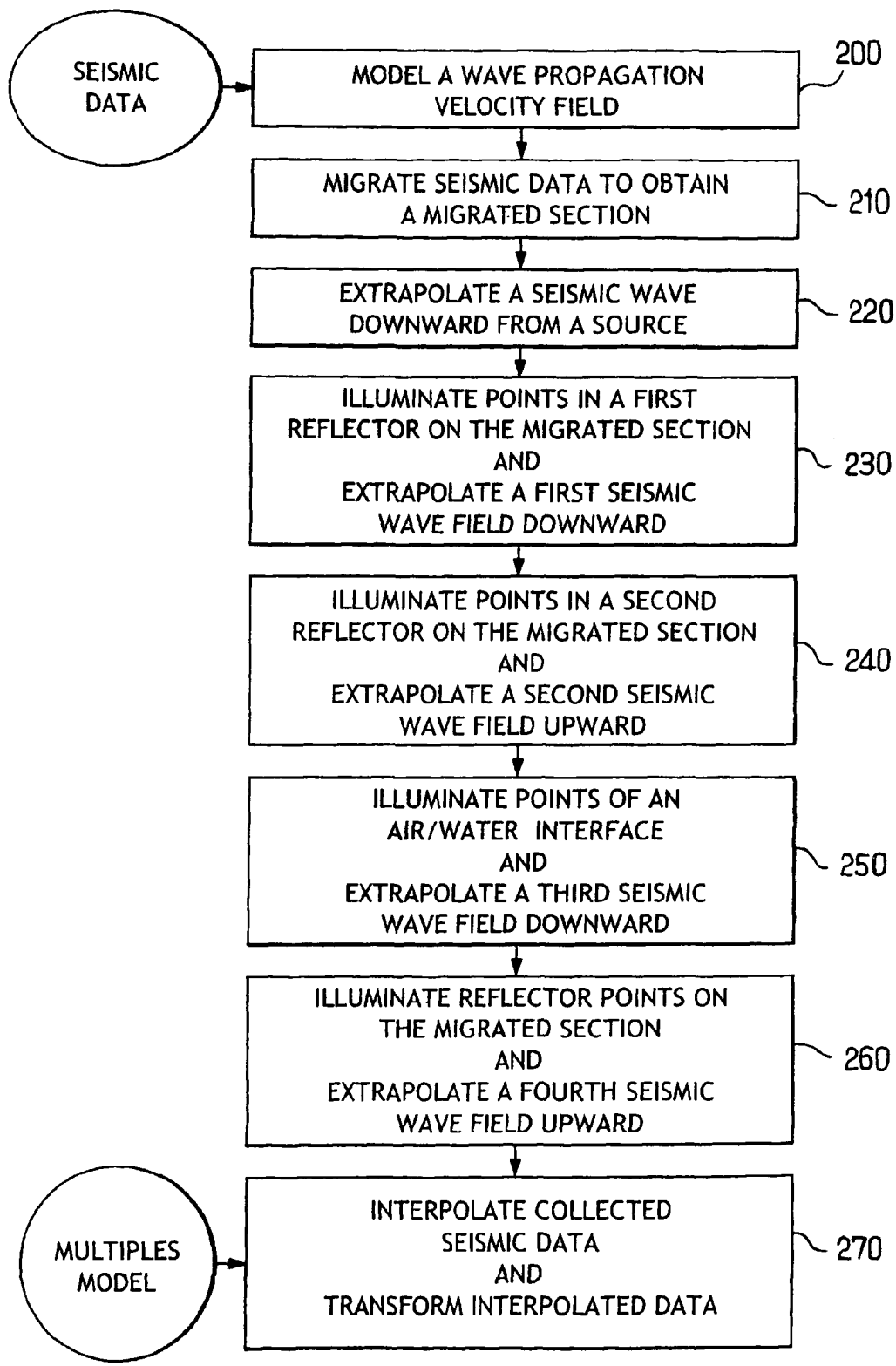

Other characteristics and advantages of the invention will be apparent from the following description that is given purely for illustrative purposes and is in no way limitative, and should be read with reference to the attached drawings on which:

FIG. 1 shows a diagrammatic illustration of the acquisition of marine seismic data showing examples of reflections from the sea floor and from reflectors below the sea floor, FIG. 2 is a flowchart of the seismic processing method, FIG. 3 is a graph illustrating a subsurface velocity field for a wave, FIGS. 4 to 8 are sectional diagrams illustrating steps in the seismic processing method for a section comprising a layer of water, the sea floor and subsurface formations formed from a stack of geological layers, FIG. 9 is a diagram illustrating a multiple reflection of the "peg-leg" type and primary reflections, FIG. 10 is a second flowchart showing the seismic processing method, FIG. 11 is another diagram illustrating steps in the seismic processing method.

DESCRIPTION

General

FIG. 1 diagrammatically illustrates marine seismic prospecting. In particular, a water mass 10 is shown extending above a sea floor 12 with a seismic prospecting vessel 13 on the water surface (surface 11) that tows one or several streamers 14 including a plurality of seismic receivers 15 (hydrophones).

One or several seismic sources 16 designed to emit an acoustic wave in water are deployed from the vessel 13. The source 16 may be a compressed air gun, a sea vibrator or other types of sources known to those skilled in the art.

The emitted seismic vibration travels along several paths and is reflected at interfaces between materials with different acoustic impedances such as the sea floor 12, and reflections are picked up by receivers 15. The wave also propagates in the subsurface and is reflected at interface 19.

For the sake of simplicity, only one of the reflecting interfaces is shown: in reality, there may be many of these reflecting interfaces (reflectors).

The trajectories of the waves shown in 17 and 18 are called direct or primary waves, since the trajectory only includes one reflection from an interface or the sea floor 12 before detection by a receiver 15.

A multiple reflection of the multiple sea floor type is also represented by the seismic trajectory 20 in FIG. 1, that is reflected twice from the sea floor 12 and once from the surface 11 of the water mass.

Multiple reflections form a serious difficulty for the processing of seismic data since they mask real primary seismic events that take place in a time comparable to the time taken by the wave undergoing multiple reflections to reach the same hydrophone and they form a source of spurious data.

Modelling/Subtraction Processing

An example embodiment of the method according to the invention will now be described with reference to FIGS. 2 to 11.

This method takes place in two phases. The first phase consists of calculating a model of the wave propagation velocity field, and of migrating the recorded seismic data. The second phase consists of calculating a multiple reflections model.

Migrating Recorded Data

A first step (100) consists of calculating a seismic wave propagation velocity field. A time or a depth migration consists of displacing points in the acquisition volume based on a propagation velocity field.

The velocity field may be calculated by any type of method known to those skilled in the art as a seismic inversion method. The simplest seismic inversion method consists of testing all possible input signals and observing the outputs that they generate. With this seismic inversion method, the modelled response closest to the observed response is considered to be the solution to the inversion. The result is thus a velocity model.

An example velocity model 80 is illustrated in FIG. 3. This model corresponds to the subsurface formation area illustrated in FIG. 4. This velocity model is shown in a coordinate system in which the abscissa 25 and the ordinate 26 are graduated in kilometres. Thus, the velocity model illustrated in FIG. 3 models velocities over a distance of 9 km and a depth of 3 km.

This velocity model includes different areas 21, 22, 23, 24 corresponding to four geological layers. For information, the first layer 21 is below the sea floor and has a propagation velocity of 1500 m/s, the second layer 22 is below the first layer 21 and has a propagation velocity of 2500 m/s, the third layer 23 included within the second layer 22 has a propagation velocity of 2000 m/s, and the fourth layer 24 located underneath the second layer 22 has a propagation velocity of 2000 m/s.

Once the velocity field has been obtained, the second step (110) in the method consists of migrating traces obtained from each seismic receiver, which form seismic data. This trace migration operation is intended to restitute the correct shapes of geological interfaces.

Traces may be migrated in time or in depth, depending on the complexity of the geological velocity model used for the migration. The two migration types are equivalent for constant velocity or vertically variable velocity. In both cases, migration can be done before or after stacking.

An in-depth prestack migration of seismic data consists of determining events that describe the subsurface vertically underneath a position on the surface (x, y), on a collection of traces. This type of collection of traces is usually stored by class of source-receiver distances (also called offset distances) and also by source-receiver pair orientation classes.

In pre-stack imaging, seismic traces associated from single source-receiver pair are processed individually.

In post-stack imaging, on the other hand, traces derived from a plurality of source-receiver pairs are combined by stacking before being processed. The post-stack imaging technique increases the signal-to-noise ratio of seismic data and reduces the number of seismic traces to be processed.

The migrated section obtained is then used as a reflectivity model (in other words "as a reflector model") for the subsurface, consequently including the sea floor and also every other reflector located within the area of the subsurface formation underneath the sea floor.

The use of the migrated section obtained as a reflectivity model eliminates the need to study the topography of the sea floor. However, such a study may be justified to reduce the required computer memory space when the depth of the sea floor changes considerably.

Figure 4:
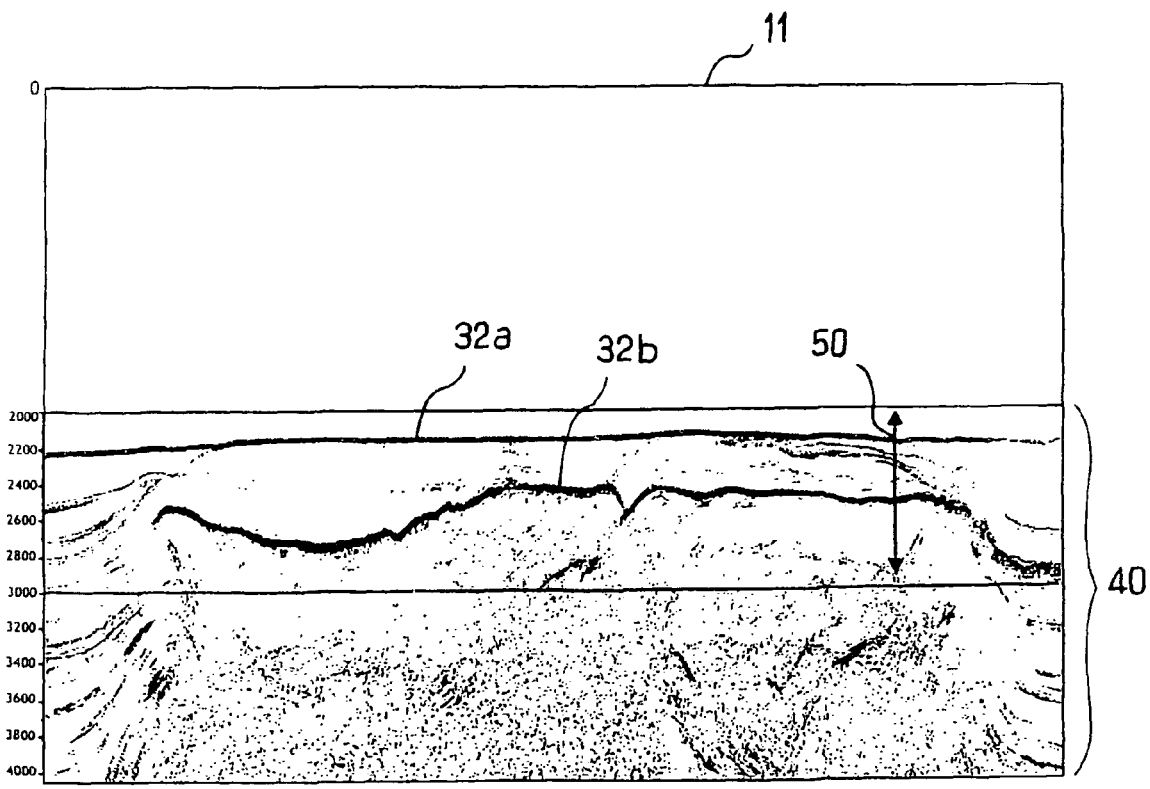

An example of a migrated section 40 including reflectors 32a, 32b is shown in FIG. 4. The part 50 of the migrated section 40 illustrated in FIG. 4 corresponds to the four areas 21, 22, 23, 24 of the model of the wave propagation velocity field illustrated in FIG. 3. This migrated section is shown in a coordinate system in which the x-axis represents a distance and the y-axis represents a depth expressed in meters. The horizontal line at altitude 0 corresponds to the surface 11 of the water layer.

A second phase of the seismic processing method consisting of modelling multiple reflections is described hereinafter.

Modelling Multiple Reflections

This second phase uses the wave equation extrapolation technique to model multiple reflections.

Several approximations of the wave equation for a single direction can be used for the wave extrapolation required by this method, depending on the degree of complexity of the velocity field:

phase shift for constant propagation velocity, phase shift plus interpolation when velocity field variations are progressive, one-way implicit extrapolators for sharper lateral velocity variations.

explicit extrapolators for strong lateral velocity variations.

Figure 5:
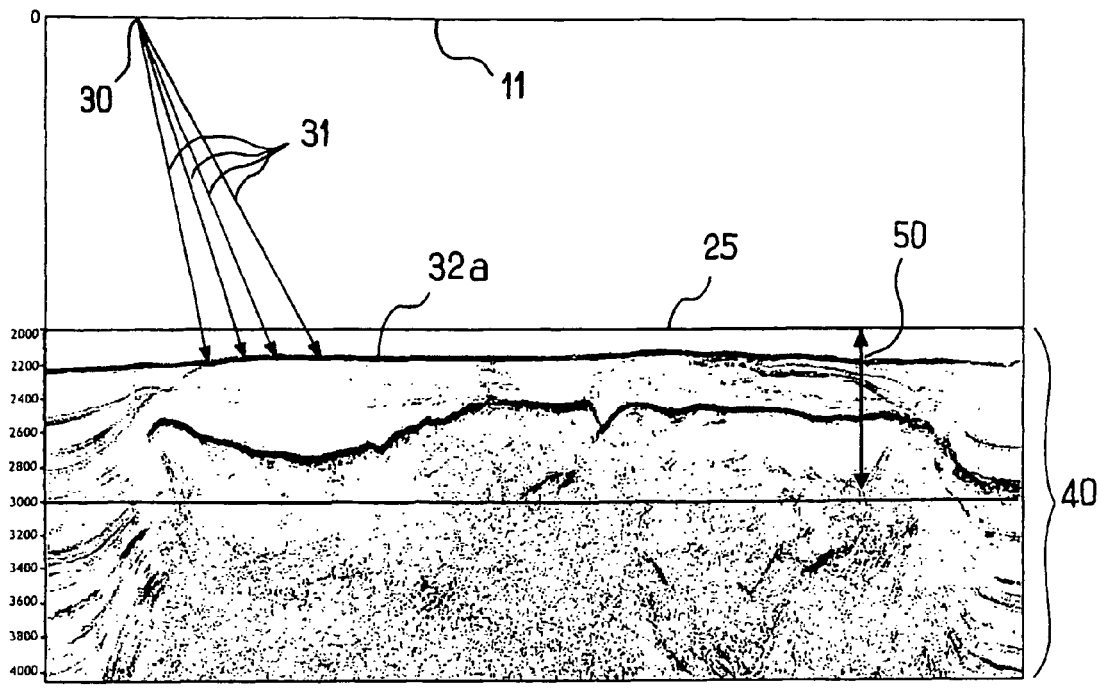

The third step (120) of the method is illustrated in FIG. 5.

In this third step (120), a direct wave 31 is emitted downwards (by wave extrapolation) from the given position (x, y, z) of a source 30 to illuminate the seismic reflectors 32a, 32b materialised by the migrated seismic section.

In the simple case of a constant velocity, wave extrapolation is emulated by using straight ray tracing. The delay corresponding to the wave travel time from the source to the reflector 32a is applied later (in the fourth step) in the exploding reflector condition for the reflector considered.

In the case of a variable velocity, a band-limited impulse is extrapolated downward using the one-way wave equation until the reflectors are illuminated.

Figure 6:
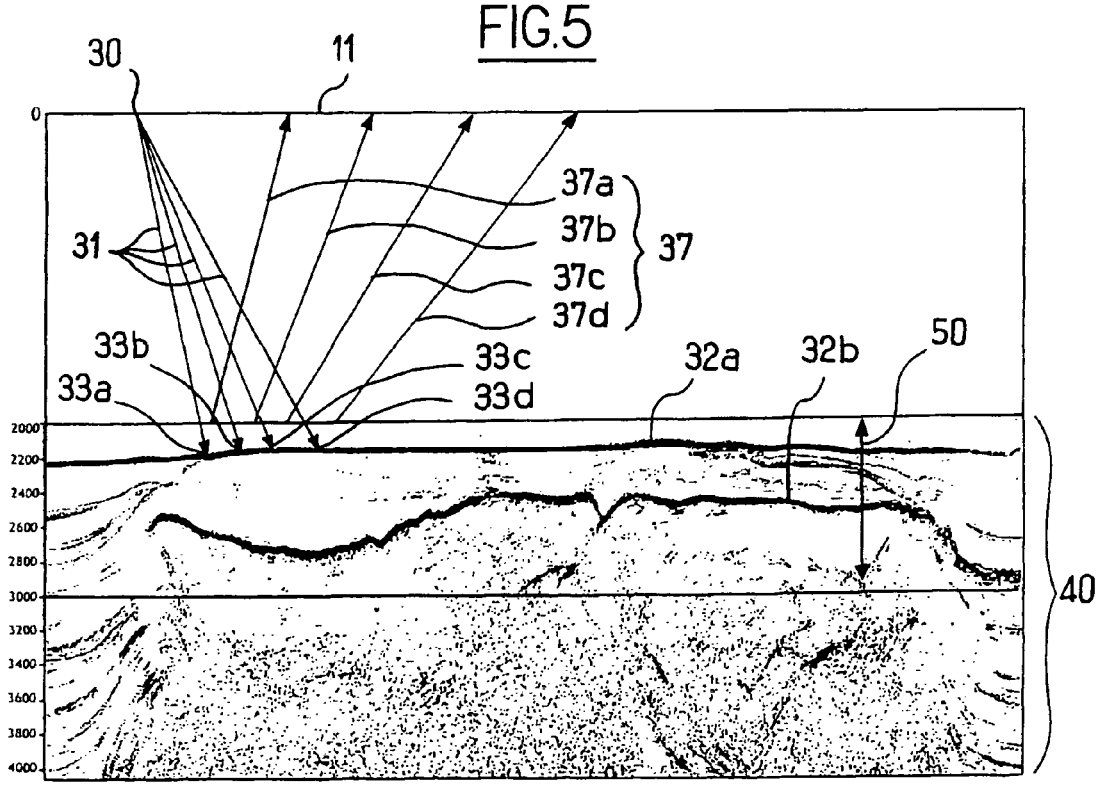

The fourth step (130) of the method is illustrated in FIG. 6.

In this fourth step, each sample 33a, 33b, 33c, 33d of the migrated section 40 is illuminated by the direct wave (31), by multiplying, in the x-y-z domain (if an NMO time migration was carried out) or the x-y-t domain (if a DMO depth migration was carried out), each migrated sample 33a, 33b, 33c, 33d by values of the downgoing direct wave 31 or by a weighted complex exponential containing the time of travel of the wave from the location of the source 30.

Once the migrated section 40 has been illuminated, the primary reflected energy is constructed by demigrating, in other words migrating upward, the "illuminated" (multiplied) migrated section.

This demigration is done by constant frequency slices, either in the f-kx-ky domain when dealing with constant velocity fields, or in the f-x-y domain when dealing with variable velocity fields.

Therefore, a migrated wave field 37 is emitted (extrapolated) upward, each wave 37a, 37b, 37c, 37d in the migrated waves field 37 being derived from an illuminated sample 33a, 33b, 33c, 33d in the migrated section. Furthermore, it should be noted that in order to simplify the diagram in FIG. 6, each wave 37a, 37b, 37c, 37d in the wave field 37 has been represented by a single arrow facing upward, it being understood that waves 37a, 37b, 37c, 37d propagate along all directions, like wave 31.

The fifth step (140) in the method is illustrated in FIG. 7. In this fifth step (140), when the migrated wave field 37 reaches the surface 11, a reflection coefficient is applied (for example equal to −1) and data are once again extrapolated downward in the model, using the same extrapolation techniques as for the first upward path (fourth step (130) in the method).

This latest downward extrapolated wave field 38 is used for "illuminating" (multiplying in the x-y-z or x-y-t domain) the migrated section 50.

The sixth step (150) in the method is illustrated in FIG. 8. In this sixth step, the migrated section 50 illuminated by the downgoing wave field 38 is migrated to the surface, in the same way as in the fourth step (130).

The result obtained in a regular grid along the x and y axes is then interpolated (160) in the x and y dimensions towards the actual receiver positions of shot point data collected to be modelled.

Finally, these data are transformed (160) by an FFT transform from the frequency domain to the time domain, thus obtaining first order surface multiple reflections.

Second order multiple reflections can be obtained by repeating the fifth and sixth steps described above, using the latest extrapolated wave field (first order multiple reflections) to illuminate the initial migrated section again. This operation is repeated recursively to obtain each higher order multiple reflection.

In the above description, we have just presented a sea floor type multiple model. However, other types of multiples such as peg-legs can be modelled using the seismic processing method.

A "peg-leg" type multiple reflection is illustrated in FIG. 9. As can be seen in FIG. 9, a seismic vibration at a shot point S close to the surface 1 of the water creates a wave 2 that travels through the sea floor 3 into an underlying geological formation, and is then reflected on the interface 4 between this geological formation and the next layer. The reflected wave then travels through the sea floor and back into the water layer. It is reflected again at the water/air interface 1 and then on the sea floor 3 before reaching the seismic receiver R that records a signal corresponding to the path travelled by the wave 2. The profile of this path is shown in FIG. 9, and is qualified as "peg-leg", due to its asymmetric shape.

The seismic processing method enabling modelling of multiple peg-leg type reflections is illustrated with reference to FIGS. 10 and 11.

The first three steps (200, 210, 220) in the method remain unchanged.

The fourth step (230) consists of illuminating each reflector sample 32a in the migrated section by the direct wave 31. A first wave field 99 is sent downward—in other words is extrapolated (or migrated) downward—to illuminate the second reflector 32b in the migrated section, each wave in the first wave field 99 being derived from an illuminated sample in the migrated section 40.

When the second reflector 32b is illuminated, the next step is the fifth step (240) in the process. A second wave field 37' is demigrated (extrapolated upward) from each sample in the second illuminated reflector 32b.

When the second wave field 37' reaches the surface 11 of the water mass, the sixth step (250) of the seismic method is carried out consisting of extrapolating a third wave field 38' downward.

When the third wave field intersects the first reflector 32a, the seventh step (260) of the method is carried out. A fourth wave field is extrapolated upward.

When data have been interpolated and transformed by FFT, the result is a model of peg-leg type multiples.

All multiple reflection types can thus be modelled using seismic processing methods presented herein. Furthermore, all these types of multiple reflections can be modelled at all orders.

Once the multiple reflections have been modelled, they are subtracted from the unprocessed seismic data.

The seismic processing method described above provides a means of modelling multiple reflections for any type of offset resulting from the reverberation between the free surface and subsurface reflectors in the two-dimensional (2D) and three-dimensional (3D) domains.

It should be noted that multiple reflections modelling that has just been described can be made on all subsurface reflectors modelled by the migrated section obtained at the output from the first phase.

It should be noted also that in the case of this method, the migration operation for seismic traces to restitute correct forms of geological interfaces is carried out before the elimination of spurious data arising from multiple reflections, unlike traditional techniques in which traces are migrated after spurious data have been eliminated.

Furthermore, the above description of multiple reflections with reference to marine seismic exploration is in no way limitative. Multiple reflections also occur in land seismic exploration and this invention can equally be used to determine multiple reflection travel times in this context.

REFERENCES

[1] J. Verschuur, A. J. Berkhout, and C. P. A. Wapenaar, 1992, "Adaptive surface-related multiple elimination". Geophysics, 57(9):1166-1177.
[2] Van Dedem, E. J. and Verschuur, D. J., 1988, "3-D surface-related multiple elimination and interpolation", $68^{th}$ Ann. Internat. Mtg: Soc. of Expl. Geophys., 1321-1324.
[3] Wiggins, J. W., 1988, "Attenuation of complex water-bottom multiples by wave-equation-based prediction and subtraction". Geophysics, 53(12), 1527-1539.
[4] Berryhill, J. R., and Kim, Y. C., 1986, "Deep-water peg-legs and multiples". Geophysics, 51, 2177-2184.
[5] Lokshtanov, D., 2000, "Suppression of water-layer multiples-from deconvolution to wave-equation approach", $70^{th}$ Ann. Internat. Mtg: Soc. of Expl. Geophys., 1981-1984.

The invention claimed is:

1. A seismic processing method in which, in order to eliminate multiple reflections in seismic data obtained from seismic sensors,
   the seismic data are migrated in time or in depth thereby generating a migrated section,
   a seismic wave is extrapolated from a seismic source to a reflector in the migrated section to determine an approximation of multiple reflections by building a model of multiple reflections for any type of offset, and
   said approximation of multiple reflections is subtracted from the seismic data.

2. A method according to claim 1, in which a wave propagation velocity field is modelled before migration.

3. A method according to claim 1 in which, after said extrapolation step:
   each point of the reflector in the migrated section intersecting the downward extrapolated seismic wave, is illuminated,
   a first seismic wave field is extrapolated upward from the points of the reflector in the migrated section which have been illuminated by the downward extrapolated seismic wave.

4. A method according to claim 3, in which, after said illumination and extrapolation steps:
   each point of a water/air interface intersecting the waves of the first wave field is illuminated, a second seismic wave field is extrapolated downward starting from the points of the water/air interface which have been illuminated by the waves of the first wave field.

5. A method according to claim 4, in which, after said further illumination and extrapolation steps:
   each point of the reflector in the migrated section intersecting the waves in the second wave field is illuminated,
   a third seismic wave field is extrapolated upward starting from the points of the reflector in the migrated section which have been illuminated by the waves in the second wave field.

6. A method according to claim 5, further comprising the step of interpolating seismic data thus extrapolated towards the real positions of the receivers, and transforming interpolated seismic data from the frequency domain to the time domain, in order to obtain a first order multiple reflections model.

7. A method according to claim 5, further comprising the steps of:
   illuminating each point of a water/air interface intersecting the waves in the third wave field,
   extrapolating a fourth seismic wave field downward starting from each point of the water/air interface, illuminated by the waves in the third wave field,
   illuminating each point of the reflector in the migrated section intersecting the waves in the fourth wave field,
   extrapolating a fifth seismic wave field upward from the points of the reflector, illuminated by the waves in the fourth wave field,
   interpolating seismic data thus extrapolated towards the real positions of the receivers, and transforming interpolated seismic data from the frequency domain to the time domain, in order to obtain a second order multiple reflections model,
   repeating these various steps to obtain a higher order multiple reflections model.

8. A method according to claim 6, further comprising the steps of:
   illuminating each point of the water/air interface intersecting the waves in the third wave field,
   extrapolating a fourth seismic wave field downward starting from each point of the water/air interface, illuminated by the waves in the third wave field,
   illuminating each point of the reflector in the migrated section intersecting the waves in the fourth wave field,
   extrapolating a fifth seismic wave field upward from the points of the reflector, illuminated by the waves in the fourth wave field,
   interpolating seismic data thus extrapolated towards the real positions of the receivers, and transforming interpolated seismic data from the frequency domain to the time domain, in order to obtain a second order multiple reflections model,
   repeating these various steps to obtain a higher order multiple reflections model.

* * * * *

UNITED STATES PATENT AND TRADEMARK OFFICE
CERTIFICATE OF CORRECTION

PATENT NO. : 7,881,154 B2
APPLICATION NO. : 11/578175
DATED : February 1, 2011
INVENTOR(S) : Antonio Pica Page 1 of 1

It is certified that error appears in the above-identified patent and that said Letters Patent is hereby corrected as shown below:

In Column 2, Line 39, delete "π-p" and insert -- $\bar{c}$-p --, therefor.

In Column 7, Line 58, in Claim 2, delete "according," and insert -- according --, therefor.

Signed and Sealed this
Twentieth Day of March, 2012

David J. Kappos
*Director of the United States Patent and Trademark Office*